United States Patent

Bassett et al.

[11] Patent Number: 6,039,163
[45] Date of Patent: Mar. 21, 2000

[54] CLUTCH FRICTION DISC BALANCING METHOD

[75] Inventors: Michael L. Bassett; Gregory W. Batterton, both of Auburn; Andrzej P. Szadkowski, Fort Wayne, all of Ind.

[73] Assignee: Eaton Corporation, Cleveland, Ohio

[21] Appl. No.: 09/248,619

[22] Filed: Feb. 11, 1999

[51] Int. Cl.[7] .................................................. F16D 13/58
[52] U.S. Cl. ........................................................ 192/110 R
[58] Field of Search ............................. 192/30 V, 107 R, 192/110 R, 213; 74/573 R

[56] References Cited

U.S. PATENT DOCUMENTS

| 4,591,041 | 5/1986  | Valier .............................. | 192/107 R   |
| 4,778,040 | 10/1988 | Kabayama ....................... | 192/110 R   |
| 5,447,218 | 9/1995  | Tauvron ........................... | 192/110 R   |
| 5,655,641 | 8/1997  | Ament et al. .................... | 192/212     |
| 5,762,558 | 6/1998  | Takehira ........................... | 192/110 R X |

Primary Examiner—Charles A. Marmor
Assistant Examiner—Saúl J. Rodríguez
Attorney, Agent, or Firm—Loren H. Uthoff, Jr.

[57] ABSTRACT

A method of balancing a clutch disc using one or more balancing weights inserted into balancing voids formed in the clutch disc carrier plate which are trapped between the friction facings. A first method involves determining the imbalance of the complete clutch disc assembly and then partially removing a friction facing so that a balancing weight can be inserted into a balancing void formed in the carrier plate. In a second method, the imbalance of the carrier plate and friction facings are separately measured prior to assembly. The most favorable rotational orientation is determined and then the number, size and location of one or more balance weights are determined and the balance weights are inserted into the balance voids. The friction facings are then assembled to the carrier plate thereby trapping the balance weights in position. To aid in the retention of the balance weights, a first friction facing can be attached to the carrier plate, the balance weights inserted and then the second friction facing can be attached to the carrier plate trapping the balance weights in position where the balancing void formed in the clutch disc carrier plate has a decreased cross-sectional area at an increased radial distance from the center of rotation of the clutch disc.

3 Claims, 3 Drawing Sheets

CLUTCH FRICTION DISC BALANCING METHOD

FIELD OF THE INVENTION

The present invention relates to a method to balance a clutch friction disc as is typically used in a motor vehicle. More specifically, the present invention relates to a method to balance a clutch disc where a balance weight is added to one or more voids formed in a clutch disc carrier plate.

PRIOR ART

To achieve static and/or dynamic balancing of a clutch friction disc to provide smooth rotational operation of the clutch it has been known to grind away portions of the friction facing and disc carrier plate. This practice results in the generation of dust particles formed of the friction material attached to the disc carrier plate. Often the materials used in formulating the friction material are hazardous and must be controlled so that air born particles are not transferred into the environment.

SUMMARY OF THE INVENTION

The present invention discloses a method to balance a clutch disc by inserting one or more balance weights into balance voids formed in the clutch disc carrier plate which are held in position between the friction facings.

Following assembly, the imbalance of the clutch disc assembly is measured and the location and size of one or more balance weights are determined. The friction facings are then pulled slightly away from the carrier plate, the balance weights inserted into respective balance voids and the friction facings are allowed to relax against the carrier plate. This method provides for an easy, simple, environmentally friendly method to balance the clutch disc.

An alternate method to balance the clutch disc is to measure the imbalance of the carrier plate and each friction facing prior to assembly, calculate an optimum rotational orientation between the components and calculate the balance weight(s), size and location. One friction facing is then attached to the carrier plate and the balance weights are inserted into the balance voids. Then the second friction facing is attached to the carrier plate to complete the assembly.

It is also possible using the present invention to balance a clutch disc subassembly such as a disc carrier plate with the friction facings riveted on and subsequently complete the final assembly.

One object of the present invention is to provide a simplified method of balancing a clutch disc.

Another object of the present invention is to provide a simplified method of balancing a clutch disc where no dust particles are generated.

Another object of the present invention is to provide a method of balancing a clutch disc by adding one or more balancing weights to the clutch disc within voids formed in the clutch disc carrier plate.

Still another object of the present invention is to provide a method of balancing a clutch disc by adding one or more balancing weights to the clutch disc located within voids formed in the clutch carrier plate and sandwiched between the friction facings.

DETAILED DESCRIPTION OF THE PREFERRED EMBODIMENT

Figure 1:
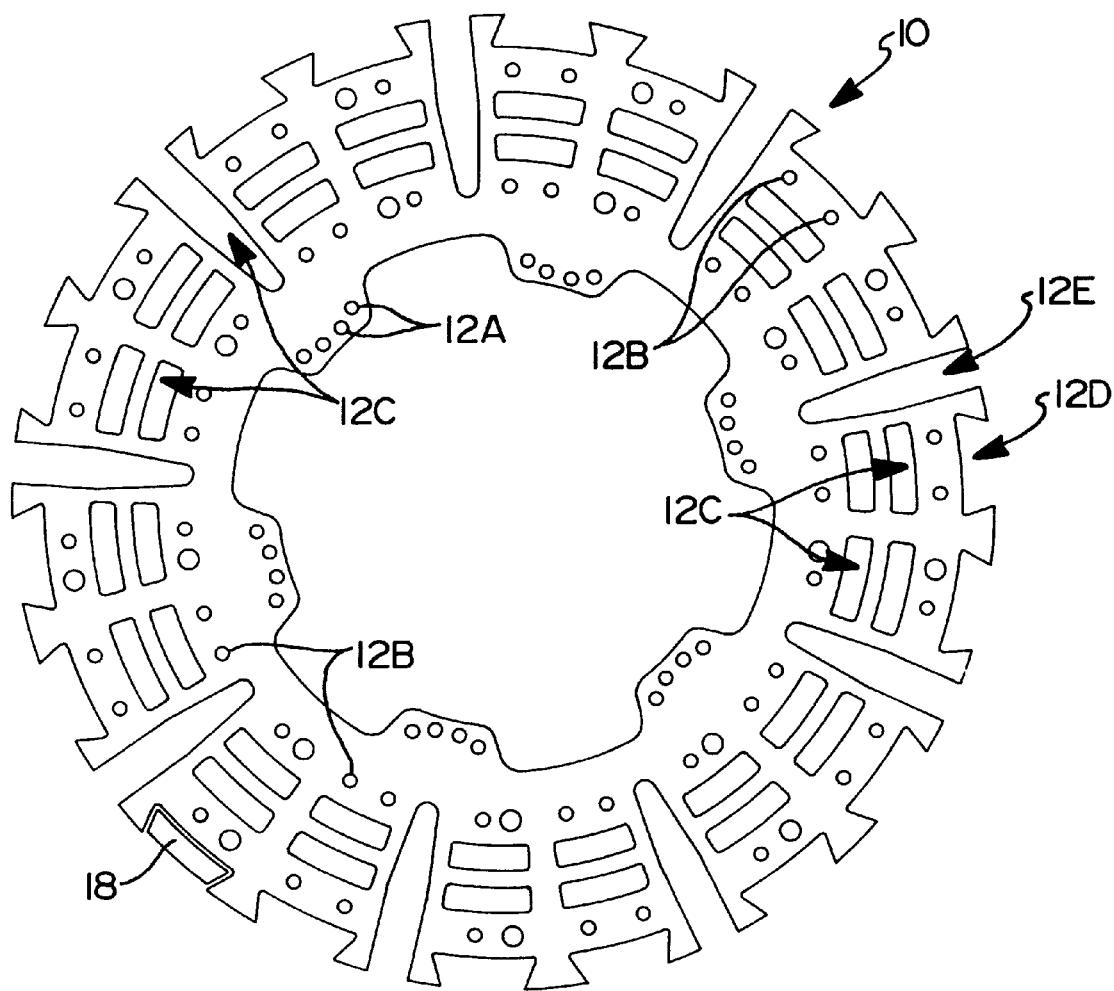
FIG. 1 is a front elevational view of the clutch disc carrier plate of the present invention.
Figure 2:
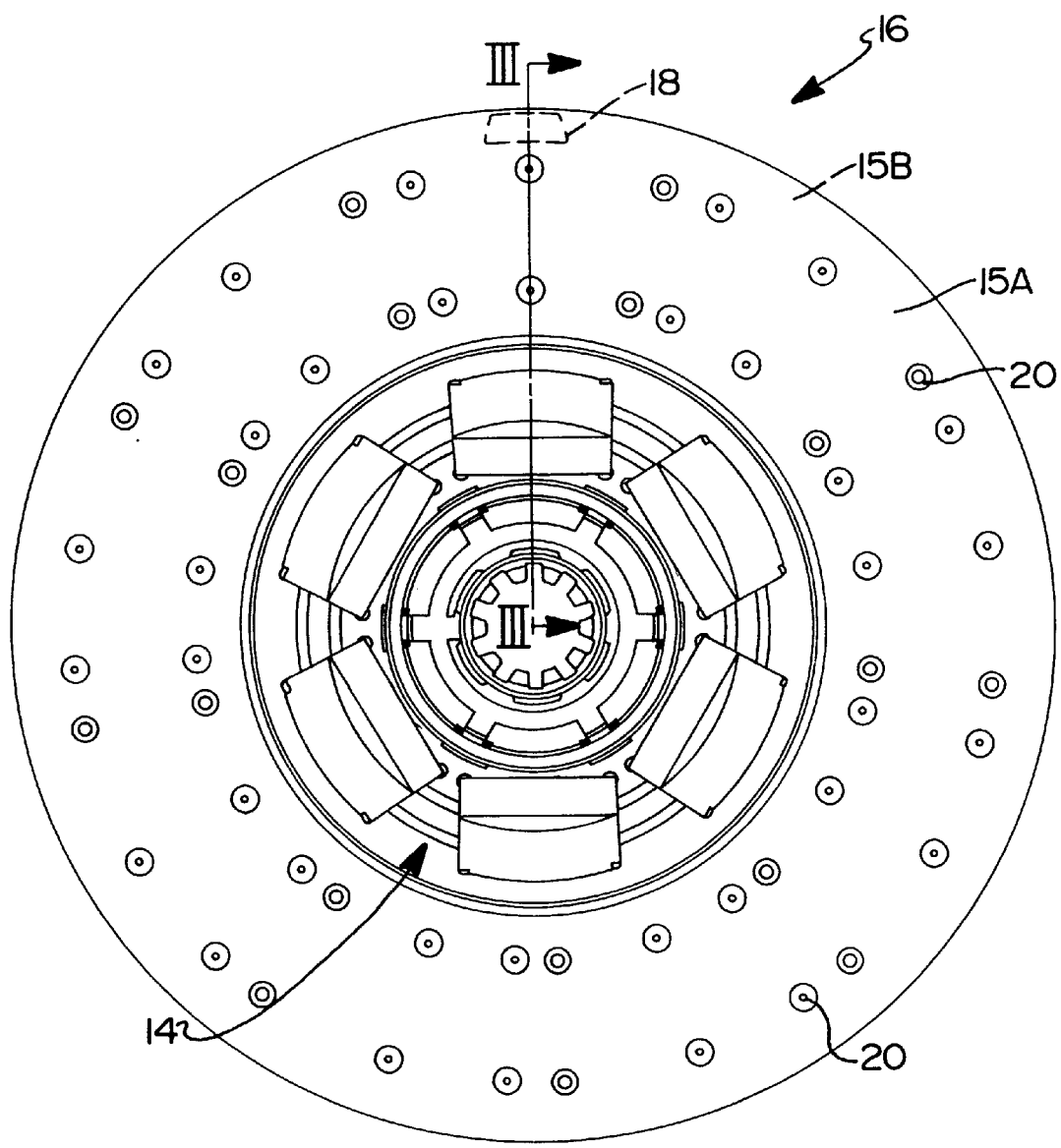
FIG. 2 is a front elevational view of the clutch disc assembly of the present invention.

FIG. 1 shows a front elevational view of a clutch disc carrier plate 10 of the present invention where a plurality of axial voids are formed in the structure. FIG. 2 is a front elevational view of the clutch disc 16 of the present invention. Some of the voids are hub attachment voids 12A for purposes of attaching the carrier plate 10 to the clutch hub 14 and others are friction facing mounting voids 12B used for attaching a first and second friction facings 15A, 15B (see FIG. 2) to the carrier disc 10. All of the others can be used as balancing voids 12C which include a plurality of peripheral balancing voids 12D, all of which are available for use in adding weight to the clutch disc 16 for balancing purposes. The balancing process involves assembly of the clutch disc 16 then measuring the imbalance of the assembly. For purposes of subsequent removal, the friction facings 15A, 15B can be only temporarily attached or partially to the carrier plate 10 to facilitate later separation of one or both of the friction facings 15A, 15B from the carrier plate 10 for inserting the balance weight(s). The number, location and size of one or more balance weights 18 are then calculated. One or both first and second friction facings 15A and/or 15B are then separated from the carrier plate 10 and the balance weights 18 are inserted into the proper balance voids 12C and/or peripheral balance voids 12D and/or balance voids 12E. Shown in FIG. 1 is a balance weight 18 inserted into one of the peripheral balance voids 12D. The friction facings 15A, 15B are then permanently attached to the carrier plate 10. If the friction facings 15A, 15B are sufficiently compliant they can be permanently assembled to the carrier plate 10 in the first instance, assembly balance checked and then one or both of the friction facings 15A, 15B can be pried away from the carrier plate 10 a sufficient amount to allow the balance weight 18 to be inserted in a peripheral balance void 12D and/or peripheral balance void 12E. The friction facings 15A and 15B are then allowed to return to their normal position against the carrier plate 10 thereby restraining the balance weight 18.

The most convenient balancing voids to use for the purposes of balancing the clutch disc 16 is the plurality of peripheral balancing voids 12D and 12E which open to the peripheral edge of the carrier disc 10. Using these peripheral balancing voids 12D, 12E, the friction facing 15A and/or 15B can be pulled away only slightly from the carrier plate 10 and one or more balancing weights 18, which are appropriately shaped and sized, can be inserted into respective peripheral balancing voids 12D and 12E. The peripheral voids 12D are preferably shaped to trap the balancing weight 18 in a given radial position. Ideally, as shown by balancing voids 12D the cross-sectional area of the void decreases in some manner with an increased radial distance from the center of rotation of the clutch disc 16. This geometry functions to trap the balancing weight in the balancing void 12 between the friction facings 15A and 15B so that centrifugal force does not dislodge the balancing weights 18 when the clutch disc 16 is rotated at high speeds. The shape shown in FIG. 1 is just one that will perform this function while many others are possible and are readily designed by one skilled in the art. The friction facing 15A and/or 15B are then allowed to relax against the carrier plate 10.

The balancing weight 18 can be modified in shape to fit any of the other balancing voids 12C with the installation procedure similar to that described above.

Alternatively, the balancing procedure can be modified to first measure the imbalance of each of the unassembled components i.e. separate imbalance information is acquired for the carrier plate 10 and the first friction facing 15A and the second friction facing 15B. Based on this information an optimum rotational orientation for the components is determined and the necessary number, size and location of the balance weights(s) 18 is determined. The location and magnitude of the balancing weight(s) 18 is then calculated based on the measured imbalance of the carrier plate 10 and each of the first and second clutch facings 15A, 15B and the location and size of the balancing voids 12C which include the preferred peripheral voids 12D and 12E. The calculation of the balance weights 18 number, size and location is complicated by the location of the balancing voids 12C. One friction facing 15A is attached to the carrier plate 10 in the proper rotational orientation. The balancing weight(s) 18 is then inserted in the identified balancing void(s) 12C, 12D and/or 12E and the facing 15B is attached to the carrier plate 10 in the proper rotational orientation.

Figure 3:
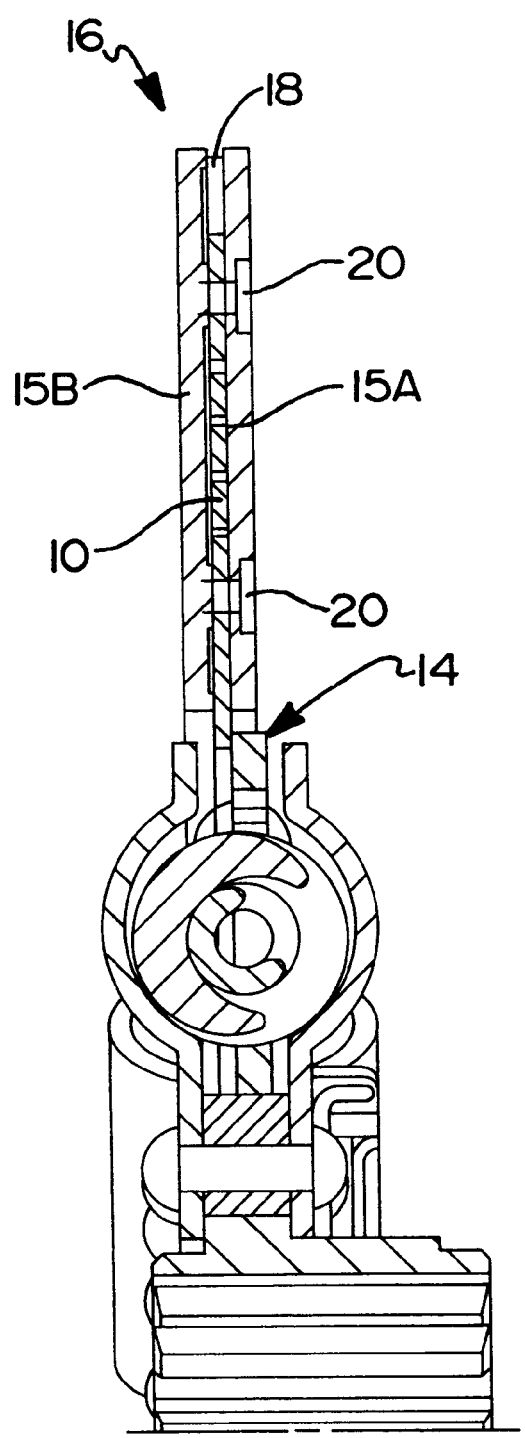
FIG. 3 is a cross-sectional view of the clutch disc assembly of FIG. 2 taken along line III—III.

Now referring to FIG. 3, a partial cross-sectional view of the clutch disc 16 of FIG. 2 taken along line III—III is shown. The first and second friction facings 15A and 15B are attached to the carrier plate 10 using a plurality of rivets 20 thereby trapping the balance weight 18 in one of the peripheral balancing voids 12D. The carrier plate 18 is attached to the hub 14 which is splined to a transmission input shaft (not shown).

Having now described the invention in detail in accordance with the requirements of the patent statutes, those skilled in the art will have no difficulty in making changes and modifications in the individual parts or their relative assembly in order to meet specific requirements or conditions. Such changes and modifications may be made without departure from the scope and spirit of the invention, as set forth in the following claims.

What is claimed is:

1. A method of balancing a clutch disc having a carrier plate with friction facings attached to respective sides of the carrier plate comprising:

measuring the imbalance of the clutch disc;

determining the size and shape of one or more balance weights;

separating at least one of the friction facings from the carrier plate;

inserting said balance weights in one or more corresponding balancing voids formed in said carrier plate; and reattaching the friction facings to the carrier plate.

2. A method of balancing a clutch disc having a carrier plate with first and second friction facings to be attached to respective sides of the carrier plate comprising:

measuring the imbalance of the carrier plate having a plurality of balancing voids formed therein;

measuring the imbalance of the first friction facing;

measuring the imbalance of the second friction facing;

determining a relative optimum rotational orientation between the carrier plate and each of the first and second friction facings;

determining the size and shape of one or more balance weights based on the location of the balancing voids and the imbalance of the carrier plate and the imbalance of the first and second friction facings and the optimum rotational orientation of the first and second friction facings relative to the carrier plate;

inserting the balance weights into respective balancing voids; and attaching the first and second friction facings to respective sides of the carrier plate.

3. A method of balancing a clutch disc having a carrier plate with first and second friction facings to be attached to respective sides of the carrier plate comprising:

measuring the imbalance of the carrier plate having a plurality of balancing voids formed therein;

measuring the imbalance of the first friction facing;

measuring the imbalance of the second friction facing;

determining the size and shape of one or more balance weights based on the location of the balancing voids and the imbalance of the carrier plate and the imbalance of the first and second friction facings and the optimum rotational orientation of the first and second friction facings relative to the carrier plate;

attaching the first friction facing to the earner plate;

inserting the balance weights into respective balancing voids; and attaching the second friction facing to the carrier plate.

* * * * *